US010618652B2

(12) United States Patent
Tamkin, Sr.

(10) Patent No.: US 10,618,652 B2
(45) Date of Patent: Apr. 14, 2020

(54) SURFACE WASHING DRONE (71) Applicant: DRONE WASH, INC., Beverly Hills, CA (US)

(72) Inventor: Scott J. Tamkin, Sr., Los Angeles, CA (US)

(73) Assignee: DRONE WASH, Inc., Beverly Hills, CA (US)

( * ) Notice: Subject to any disclaimer, the term of this patent is extended or adjusted under 35 U.S.C. 154(b) by 295 days.

(21) Appl. No.: 15/493,050

(22) Filed: Apr. 20, 2017

(65) Prior Publication Data
US 2017/0305547 A1   Oct. 26, 2017

Related U.S. Application Data

(60) Provisional application No. 62/325,099, filed on Apr. 20, 2016.

(51) Int. Cl.
| | | |
|---|---|---|
| B64C 39/02 | (2006.01) | |
| B08B 3/02 | (2006.01) | |
| B08B 1/00 | (2006.01) | |
| A47L 1/02 | (2006.01) | |
| B08B 1/04 | (2006.01) | |
| G08G 5/00 | (2006.01) | |
| B08B 3/04 | (2006.01) | |
| B25J 11/00 | (2006.01) | |
| G05D 1/00 | (2006.01) | |

(52) U.S. Cl.
CPC .............. *B64C 39/024* (2013.01); *A47L 1/02* (2013.01); *B08B 1/00* (2013.01); *B08B 1/001* (2013.01); *B08B 1/04* (2013.01); *B08B 3/024* (2013.01); *B08B 3/04* (2013.01); *B25J 11/0085* (2013.01); *G05D 1/0094* (2013.01); *G08G 5/003* (2013.01); *G08G 5/0013* (2013.01); *G08G 5/0021* (2013.01); *G08G 5/0069* (2013.01); *B64C 2201/027* (2013.01); *B64C 2201/108* (2013.01); *B64C 2201/12* (2013.01); *B64C 2201/127* (2013.01); *B64C 2201/143* (2013.01)

(58) Field of Classification Search
CPC .... B64C 39/02; B64C 39/024; B25J 11/0085; G05D 1/0033; G05D 1/0038
See application file for complete search history.

(56) References Cited

U.S. PATENT DOCUMENTS

| | | | | |
|---|---|---|---|---|
| 9,963,230 | B2 * | 5/2018 | Borman | A47L 5/12 |
| 2013/0135254 | A1 | 5/2013 | Lee et al. | |
| 2015/0274294 | A1 * | 10/2015 | Dahlstrom | B64D 1/18 239/722 |
| 2017/0057636 | A1 | 3/2017 | Azaiz | |
| 2017/0121019 | A1 * | 5/2017 | Shin | B64C 39/024 |
| 2018/0194464 | A1 * | 7/2018 | Elder | B64C 39/022 |

FOREIGN PATENT DOCUMENTS

| | | |
|---|---|---|
| EP | 3 031 538 A1 | 6/2016 |
| KR | 2003-0025662 | 3/2003 |
| WO | WO 2015/150529 A1 | 10/2015 |

OTHER PUBLICATIONS

WO, PCT/US2017/028690 ISR and Written Opinion, dated Aug. 24, 2017.

* cited by examiner

*Primary Examiner* — Stephen Johnson
(74) *Attorney, Agent, or Firm* — Trojan Law Offices (57) ABSTRACT

A surface washing drone with a modular cleaning head unit. The surface washing drone may also include a safety failover mechanism. The surface washing drone communicates and works together with other surface washing drones in a group.

19 Claims, 12 Drawing Sheets

| PART NUMBER | ITEM NO. | QTY. |
|---|---|---|
| Body Shell Top | 1 | 1 |
| Body Shell Bottom | 2 | 1 |
| Motor | 3 | 4 |
| Propeller | 4 | 4 |
| Booms | 5 | 4 |
| Motor Mount | 6 | 4 |
| Boom Extenders | 7 | 4 |
| Side Cross Beams | 8 | 2 |
| Tube Junction 1 | 9 | 2 |
| Extension Tubes | 10 | 2 |
| Tube Junction 2 | 11 | 2 |
| Back Cross Bar | 12 | 1 |
| Landing Leg | 13 | 4 |
| Battery | 14 | 2 |
| Quick Change Battery Plate | 15 | 1 |
| Mounting Bar Connector | 16 | 2 |
| Squeegee | 17 | 1 |
| Swivel Hub | 18 | 2 |
| Spur Gear 1 | 19 | 2 |
| Mounting Bar | 20 | 1 |
| Bar Hub Mount | 21 | 1 |
| Stepper Motor | 22 | 1 |
| Spur Gear 2 | 23 | 1 |
| Washing Head Swivel Mount | 24 | 1 |
| Cleaning Head | 25 | 1 |
| Angle Block | 26 | 1 |
| RtAngle Gear Motor | 27 | 1 |
| Spur Gear 3 | 28 | 1 |
| Sprayer | 29 | 2 |
| Sprayer Mount | 30 | 2 |
| Spray Tubing | 31 | 1 |
| Hose Mount | 32 | 3 |
| Parachute Mechanism | 33 | 1 |
| Camera Assembly | 34 | 1 |
| Water Pump | 35 | 1 |
| Water Reservoir | 36 | 1 |
| Sensor Tower | 37 | 2 |

| PART NUMBER | ITEM NO. | QTY. |
|---|---|---|
| Body Shell Top | 1 | 1 |
| Body Shell Bottom | 2 | 1 |
| Motor | 3 | 4 |
| Propeller | 4 | 4 |
| Booms | 5 | 4 |
| Motor Mount | 6 | 4 |
| Boom Extensions | 7 | 4 |
| Side Cross Beams | 8 | 2 |
| Tube Junction 1 | 9 | 2 |
| Extension Tubes | 10 | 2 |
| Tube Junction 2 | 11 | 2 |
| Back Cross Bar | 12 | 1 |
| Landing Leg | 13 | 4 |
| Battery | 14 | 2 |
| Quick Change Battery Plate | 15 | 1 |
| Mounting Bar Connector | 16 | 2 |
| Squeegee | 17 | 1 |
| Swivel Hub | 18 | 2 |
| Spur Gear 1 | 19 | 2 |
| Mounting Bar | 20 | 1 |
| Bar Hub Mount | 21 | 1 |
| Stepper Motor | 22 | 1 |
| Spur Gear 2 | 23 | 1 |
| Washing Head Swivel Mount | 24 | 1 |
| Cleaning Head | 25 | 1 |
| Angle Block | 26 | 1 |
| Rt Angle Gear Motor | 27 | 1 |
| Spur Gear 3 | 28 | 1 |
| Sprayer | 29 | 2 |
| Sprayer Mount | 30 | 2 |
| Spray Tubing | 31 | 1 |
| Hose Mount | 32 | 3 |
| Parachute Mechanism | 33 | 1 |
| Camera Assembly | 34 | 1 |
| Tether Hose Tower | 35 | 1 |
| Sensor Tower | 37 | 2 |

FIG. 15

# SURFACE WASHING DRONE

CROSS-REFERENCE TO RELATED APPLICATIONS

The present application claims benefit of priority with U.S. Provisional Application No. 62/325,099, filed Apr. 20, 2016, which is hereby incorporated by reference.

FIELD OF THE INVENTION

The subject matter described herein relates generally to a surface washing drone, and more particularly, to a surface washing drone with a modular cleaning head unit.

BACKGROUND OF THE INVENTION

Window washing is an established service that is often expensive, dangerous, labor intensive, and time-consuming. In the United States, high-rise window washing is governed by OSHA which has very specific standards with relation to safety. As a result, insurance, equipment, and labor make window washing cost prohibitive. For example, it may cost about $1 million to install a system, get the appropriate insurance policy, and hire washers to wash the windows of the 16 stories of a Los Angeles Condo building. For larger scale jobs, workers must lower themselves by rope and pulley or by a platform system, and there have been a large number of fatalities as a direct result of high-altitude window washing in the past 15 years, according to Health Day. Furthermore, a 50 story building may take a month or more to wash all the windows, according to the City Room blog of the New York Times.

In addition, experts agree that dirty solar panels don't produce as much power as clean panels. That loss may range as high as 25% in some areas according to the National Renewable Energy laboratory. Individual dealers have reported losses as high as 30% for some customers who failed to ever clean their panels. Global solar panel installation companies have frequently seen sizeable increases of solar efficiency on agricultural sites, of up to 30%. This has been proved by customers who have sent readings to prove solar panel cleaning has increased the output and efficiency of their array. On industrial and commercial sites there has have been increases of up to 60% and on residential arrays of up to 21%. These findings are confirmed by the World Academy of Science, Engineering & Technology, who say a drop in the efficiency of a solar photovoltaic (PV) panel is not desired. One of the contributing factors in the drop of efficiency in PV panels is the accumulated dust on the panel. Solar Energy Power Association notes that dirty solar panels can lose 20% of their energy output. The National Renewable Energy Laboratory puts that figure even higher, at 25%. Recent University research has shown that a dirty solar panel can lose 50% of its efficiency compared to a clean panel.

It would therefore be desirable to provide a method and system of providing a surface washing drone that can be controlled from a safe location to efficiently wash windows of high rises, solar panels, and other surfaces. The present invention meets these and other needs.

SUMMARY OF THE INVENTION

Briefly, and in general terms, provided herein are embodiments of surface washing drones with a pivoting, rotatable modular cleaning head unit, or drone head. The surface washing drones (which may also be referred to herein as drones for brevity) will enable building owners and property managers to significantly reduce expenses and risk when washing their windows. In some embodiments, a surface washing drone is able to fly up to about 1,600 feet in altitude and can therefore wash windows on some of the tallest buildings in the world with an operator located remotely, for example, on the ground.

The surface washing drone may clean surfaces at different angle, including surfaces that are convex or concave in nature.

In some embodiments, the surface washing drone may be equipped with a camera to enable the operator to see the location being cleaned as well as the surrounding environment. The camera may also operate to position the surface washing drone in place relative to its target. The surface washing drone may have an applicator (or cleaning head) to apply the washing fluid and the applicator may be manipulated to properly and appropriately apply the fluid and friction on the surface to create a clean surface. The surface washing drone may also contain a squeegee blade to remove the fluid and leave a clean and dry surface on the window. The surface washing drone may include a spray mechanism which sends out a jet stream of fluid.

In some embodiments, the surface washing drone may include a high-pressure air blowing device used to clean an area of debris and may also be used to dry a surface.

In some embodiments, the surface washing drone may be fitted with safety failover mechanism, such as a parachute, for safety in case of failure, for example, when one or more of the rotors fail.

In some embodiments, the surface washing drone may be powered by a tethered power cable, or by battery power, or by some other suitable power source.

In some embodiments, the surface washing drone may be fed fluid, or liquid, by tethered liquid feeding cable or by reservoir or by some other liquid feeding source.

In some embodiments, the surface washing drone tether may feed both power and liquid through the same conduit.

In some embodiments, the surface washing drone may include one or more rotating cameras, and a computer vision function to assist in at least navigation, ranging, and interaction with a cleaning target.

In some embodiments, the surface washing drone may transmit data using encryption.

In some embodiments, the surface washing drone may clean a target to a predetermined standard.

The surface washing drone may be used to clean windows with or without screens, skylights and other surfaces such as solar panels, billboards, bridges, tall structures, difficult-to-reach structures and objects, and even boats or planes.

In some embodiments, the surface washing drone may include a clamp arm to hold a hose that may be connected to the top of a building, the ground, or through an opening in the building. In some embodiments, the surface washing drone may include a water reservoir and a water pump.

In some embodiments, the cleaning head may pivot and rotate clockwise or counterclockwise at an angle from 0 up to approximately 180 degrees. In some embodiments, the modular cleaning head unit and a control (or central) unit, as described in more detail herein, may be configured to fit other consumer, commercial, or industrial drones that can support the weight and dispersal of liquid.

In some embodiments, the surface washing drone may be operated by a remote control device. In some embodiments, the surface washing drone may include a processor that can be programmed for autonomous operations.

In some embodiments, the surface washing drone may also be configured to operate in a group, or swarm format, for example, a plurality of the drones of the invention may communicate and work together.

In some embodiments, the drones of the inventions may be used in other applications, for example, painting (e.g., spraying paint, lacquer, or other coatings), firefighting (e.g., spraying water or other fire suppression material), farming, entertainment (e.g., spray battles), and so on. The drones of the invention may be configured with different spray nozzles and different tubing for the different applications.

These and other aspects and advantages of the invention will be apparent from the following detailed description and the accompanying drawings, which illustrate by way of example the features of the invention. Other systems, devices, methods, features and advantages of the subject matter described herein will be or will become apparent to one with skill in the art upon examination of the drawings and detailed description. It is intended that all such additional systems, devices, methods, features and advantages be included within this description, be within the scope of the subject matter described herein, and be protected by the accompanying claims. In no way should the features of the example embodiments be construed as limiting the appended claims, absent express recitation of those features in the claims.

BRIEF DESCRIPTION OF THE DRAWINGS

In order to better appreciate how the above-recited and other advantages and objects of the inventions are obtained, a more particular description of the embodiments briefly described above will be rendered by reference to specific embodiments thereof, which are illustrated in the accompanying drawings. It should be noted that the components in the figures are not necessarily to scale, emphasis instead being placed upon illustrating the principles of the invention. Moreover, in the figures, like reference numerals may designate corresponding parts throughout the different views. However, like parts may not always have like reference numerals. Moreover, all illustrations are intended to convey concepts, where relative sizes, shapes and other detailed attributes may be illustrated schematically rather than literally or precisely. Illustrated in the accompanying drawings is at least one of the best mode embodiments of the present invention In such drawings.

DETAILED DESCRIPTION OF THE INVENTION

The above described drawing figures illustrate the described apparatus and its method of use in at least one of its preferred, best mode embodiments, which is further defined in detail in the following description. Those having ordinary skill in the art may be able to make alterations and modifications to what is described herein without departing from its spirit and scope. Therefore, it should be understood that what is illustrated is set forth only for the purposes of example and should not be taken as a limitation on the scope of the present apparatus and its method of use.

In the following description and in the figures, like elements are identified with like reference numerals. The use of "e.g.," "etc.," and "or" indicates non-exclusive alternatives without limitation, unless otherwise noted. The use of "including" or "includes" means "including, but not limited to," or "includes, but not limited to," unless otherwise noted.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B", when used in conjunction with open-ended language such as "comprising" can refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

Described now in detail are example embodiments of surface washing drones. The surface washing drones may be referred to herein as drone system, drones or drone.

Generally, the drone system, or maybe referred to herein as drone for brevity, of the embodiments described herein may be operated by an operator located remotely from the drone, or it may operate autonomously. The drone may clean different surfaces at variable altitudes. In some embodiments, the drone may clean surfaces at altitudes ranging from 10 to 1600 feet AGL (Above Ground Level) in the majority of use cases as well as in off-nominal surface cases. In some embodiments, the drone may clean variable surfaces at different altitude blocks, for example, at altitude block 10 to 300 feet AGL, at altitude block 300 to 1100 feet AGL, and at altitude block 1100 to 1600 feet AGL. The drone may clean different types of areas to a certain cleanliness standard. In some embodiments, a cleanliness standard may be measured by using a light meter to measure the amount of light that passes through the surface that has been cleaned by the drone. In some other embodiments, a cleanliness standard may determine that a surface that is at least as clean as a surface cleaned in the same amount of time by human as a measurement of success.

In some embodiments, the drone may clean a given amount of square footage in a proportional amount of time with varying factors. The amount of time may be predetermined. For example, the drone may clean a predetermined square footage of glass in a nominal case (e.g., vertical glass surface, low wind, normal temp) within a predetermined amount of time, within a predetermined cleanliness criteria. In some exemplary operations, the drone may clean a predetermined square footage in off-nominal cases to the test grid below, units in minutes.

|  | Wind 0-10 knots | Wind 10-20 knots | Wind 20-30 knots |
|---|---|---|---|
| High Temp | 6 | 8 | 12 |
| Low Temp | 4 | 6 | 10 |
| Nominal Temp | 4 | 6 | 10 |

Exemplary high temperature may be between 32-48 degree Celsius. Exemplary low temperature may be between 0-15 degree Celsius. Exemplary nominal temperature may be between 16-31 degree Celsius.

In some embodiments, the drone may have stabilization characteristics that may allow it to recover from incidental contact with various forces or objects, and resume its flight profile. A flight profile may include information of the cleaning target, distance, cleanliness standard, and so on.

In some embodiments, the drone may have water-resistant flight system, which may allow it to remain flying in the presence of light water contact, for example, from rain or washing material.

In some embodiments, the drone may include at least one camera, for example, a High Definition (HD) camera, that may allow the drone to complete all of its functions, including, for example, spotting dirty surfaces from certain distance, take-off and landing. The camera may have at least a 180-degree field of view when rotated.

In some embodiments, the drone may include a transponder device that may allow the operator to track and display the drone's location on a Graphical User Interface (GUI).

In some embodiments, the drone may transmit data using encryption. Data encryption may provide defense against hacking. In some events of failure, for example, hacking, loss of communication, or minimum power, the drone's automatic flight computer may initiate and land the drone at a known point of origin. In some other events of failure, for example, loss of flight scenario (such as loss of power, broken flight surface), the drone may have an automatic failover capability such as deploying a parachute or harness.

In some embodiments, an operator may configure and re-configure the drone. The drone may be configure, or re-configure, for example, for different use cases or future development. The drone may include a flight software that may be reconfigurable for different types of situations and future development.

In some embodiments, a group, or fleet, of the drones, in swarm format, may communicate and work together without any repeated work in an autonomous fashion, to clean to a predetermined standard. As described herein, the drone may be operated by an operator located remotely from the drone, or it may operate autonomously. In a swarm operation, the drones may be operable by an individual remote control system and/or by a swarm control system whereby many drones may be operated by an individual control system (Pilot in Command) or by an automated control system.

In some embodiments, the drone may include a clamp arm that holds a hose from different parts of a building. The drone may include different spray nozzles and structure for attaching one or more cleaning devices.

The drone may be compliant to all pertinent regulations. For example, in the United States, the drone may be compliant to all pertinent portions of the Federal Aviation Administration (FAA) and the Occupational Safety and Health Administration (OSHA) regulations, among others. The drone may also be compliant to pertinent regulations of another country of operation.

Figure 1:
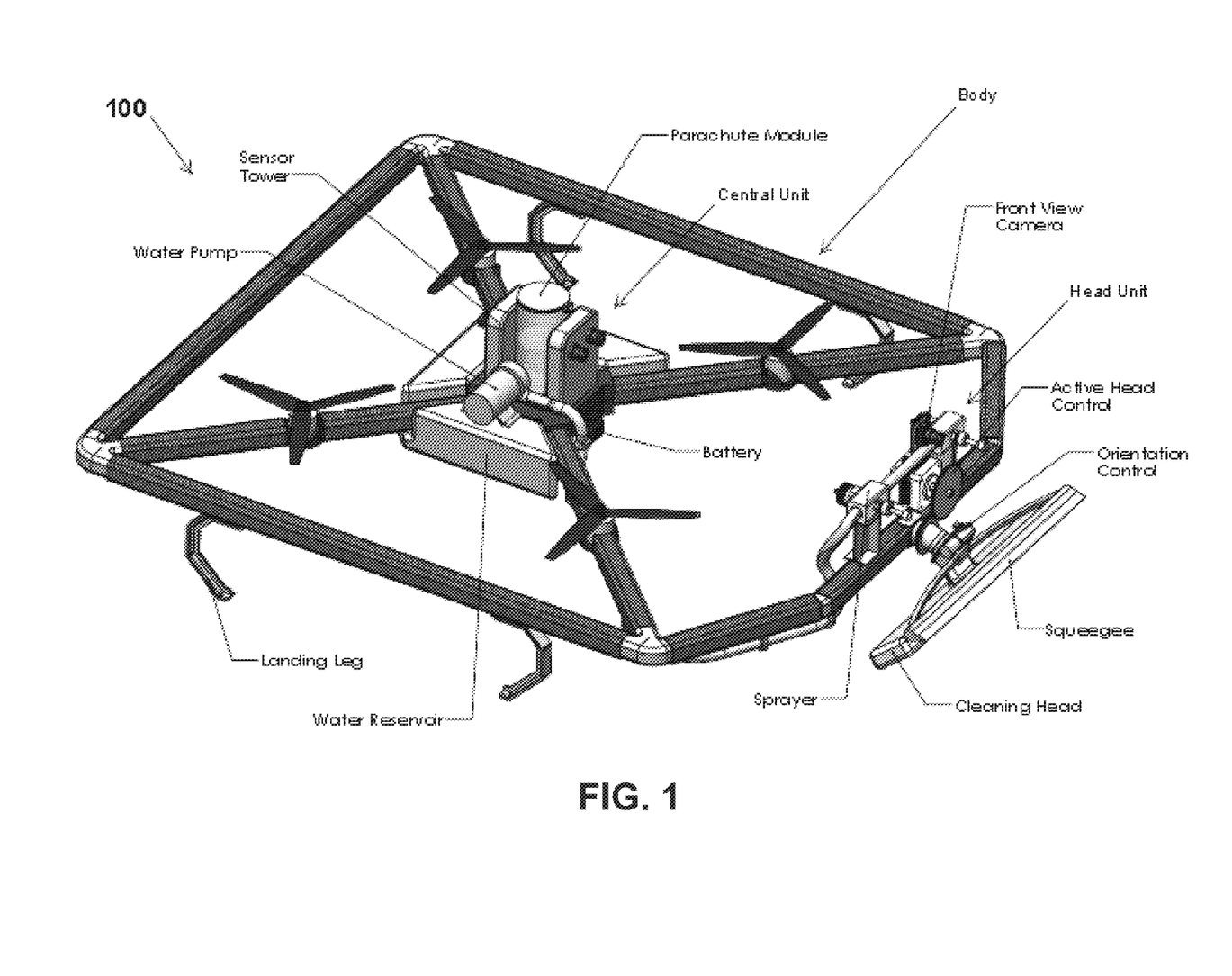
FIG. 1 illustrates a front, left perspective view of a surface washing drone with a water pump according to an example embodiment of the invention.

FIGS. 1 to 10 illustrate example embodiments of a surface washing drone 100. FIG. 1 illustrates a front, left perspective view of an example embodiment of the drone 100. Generally, the drone 100 may include a body 110 with a plurality of landing legs coupled to the body 110. The drone 100 may also include a central unit coupled to the body 110. The central unit may include, for example, battery, sensor towers, a water reservoir, a water pump, a processor, and a safety failover mechanism, for example, a parachute module. The drone 100 may also include a modular cleaning head unit, which may also be referred to herein as drone head, disposed at a front part of the body 110. For brevity, the modular cleaning head unit may also be referred to herein as cleaning head unit. The cleaning head unit may include one or more front view cameras, one or more sprayers, an active head control, an orientation control, and a cleaning head or applicator. The cleaning head unit may include both an applicator and a squeegee.

Figure 2:
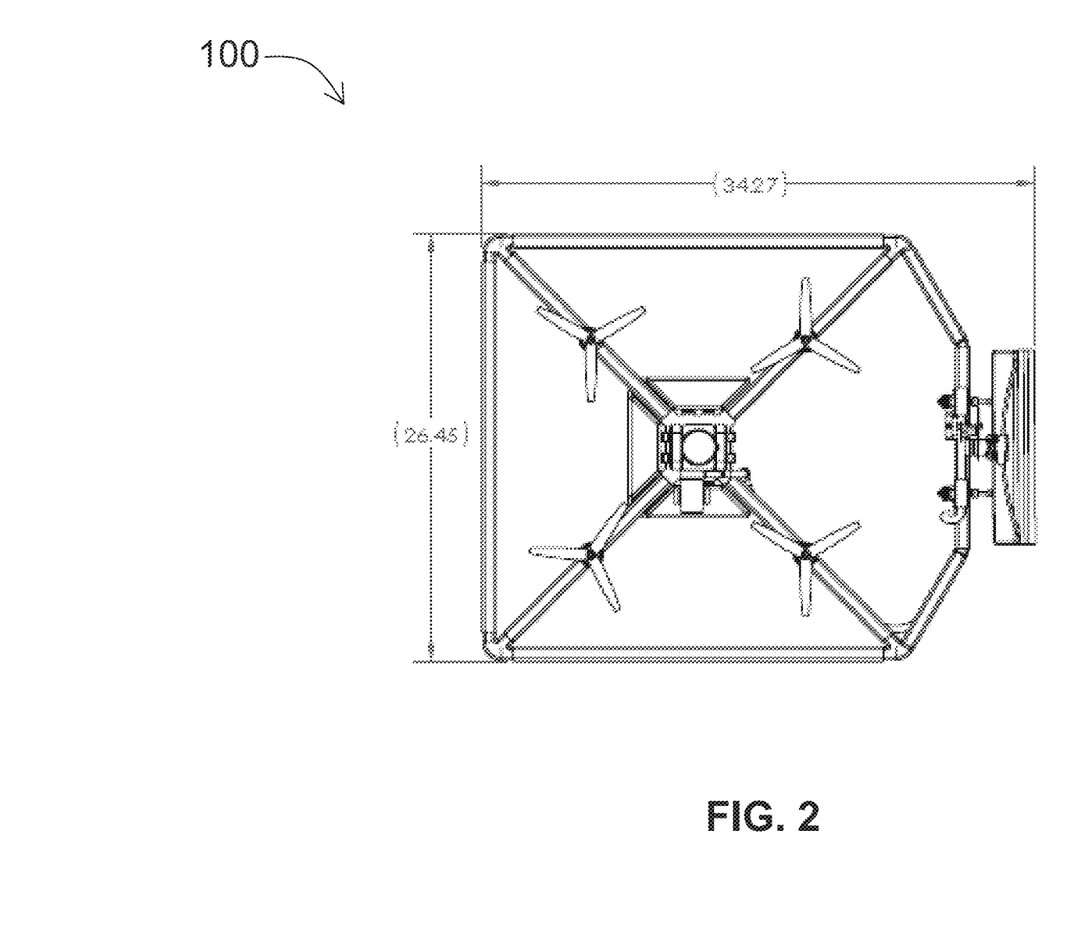
FIG. 2 illustrates a top view of the surface washing drone of FIG. 1 according to an example embodiment of the invention.

FIG. 2 illustrates a top view of an example embodiment of the drone 100. In some example embodiments, the drone 100 may have a width of approximately 26.45 inches, and a length of approximately 34.27 inches, including the head unit.

Figure 3:
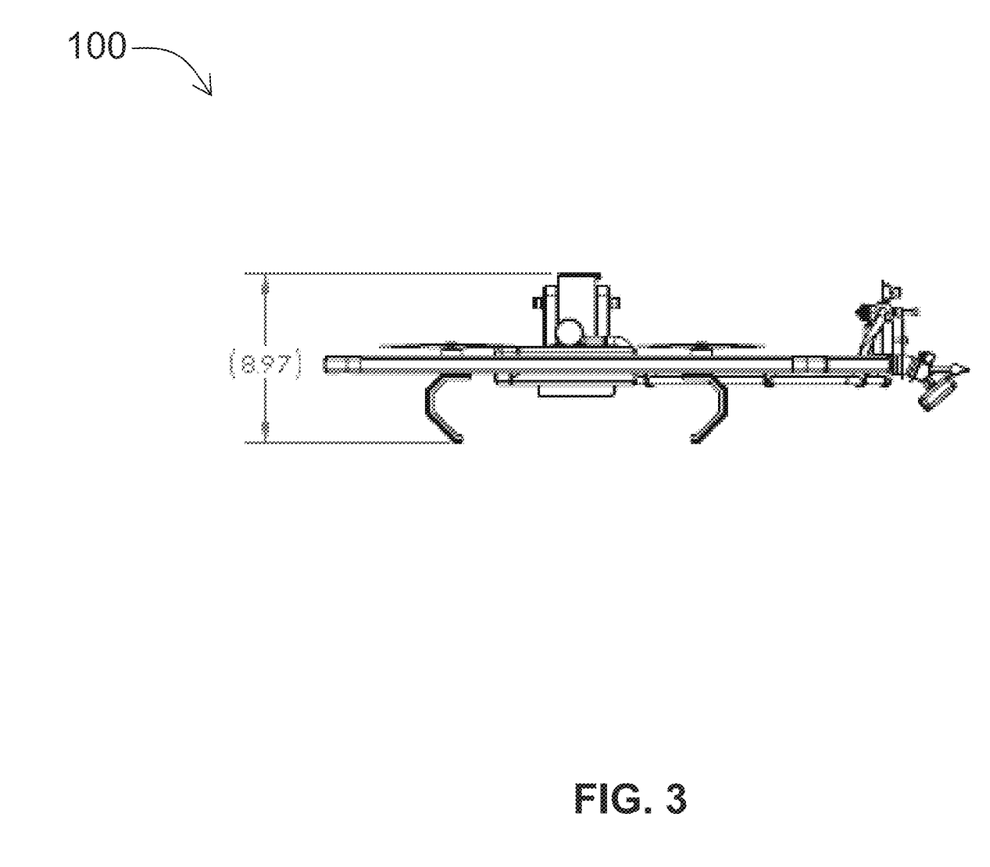
FIG. 3 illustrates a left, side view of the surface washing drone of FIG. 1 according to an example embodiment of the invention.

FIG. 3 illustrates a left side view of an example embodiment of the drone 100. In some example embodiments, the drone 100 may have a height of 8.97 inches, including the central unit and the landing legs.

Figure 4:
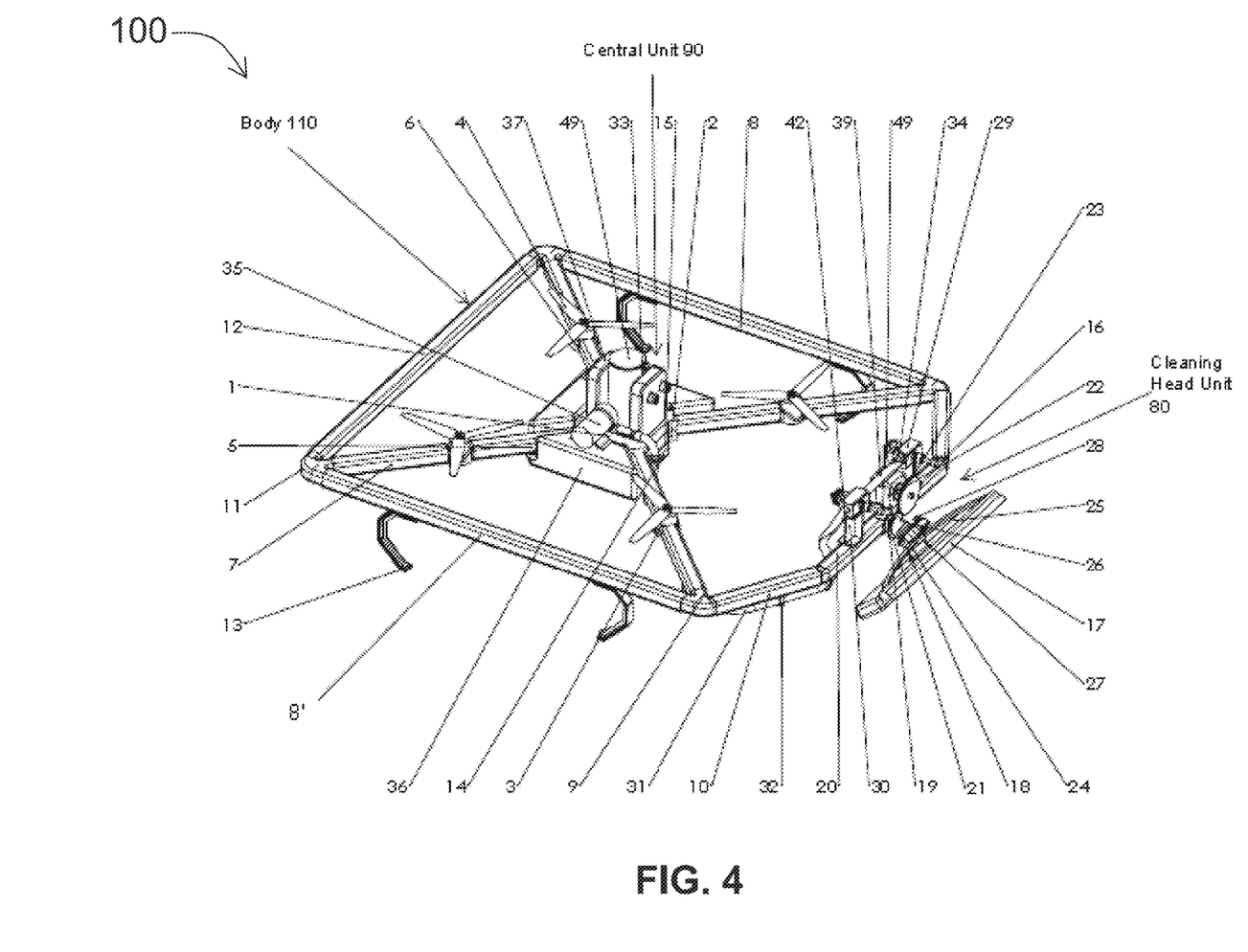
FIG. 4 illustrates another front, left perspective view of the surface washing drone of FIG. 1 according to an example embodiment of the invention.

FIG. 4 illustrates another front, left perspective view of an example embodiment of the drone 100. As described herein, the drone 100 includes a main body 110. The main body 110 may include a back cross bar 12 in the rear or distal end of the body 110, two opposite side cross beams 8 and 8', two extension tubes 10 and a mounting bar 20 disposed at the front or proximal end of the body 110, four booms 5, and four boom extensions 7. The back cross bar 12 may be coupled to the rear, distal end of the two side cross beams 8 and 8' using tube junctions 11. The two side cross beams may be coupled at their front, proximal end to the two extension tubes 10 using tube junctions 9. The two extension tubes 10 may be coupled to the mounting bar 20 using mounting bar connectors 16. The four boom extensions 7 may be coupled to the two tube junctions 11 and the two tube junctions 9 respectively. The four booms 5 may then be coupled to the central unit.

For flying, the drone 100 may include four propellers 4. The four propellers 4 may be coupled to the four booms 5 and four boom extensions 7, using four motor mounts 6. Each propeller may be controlled by a motor 3 coupled to each propeller respectively. The motors 3 are controlled by a remote control device (not shown) operated by an operator positioned, for example, on the ground. In some embodiments, the drone 100 may need to be in the line of sight of the remote control device. In some embodiments, the drone 100 may not need to be in the line of sight of the remote control device. Although four propellers are illustrated, the number of propellers is not limited to four. In some embodiments, the drone 100 may include less than four propellers. In some embodiments, the drone 100 may include more than four propellers.

The communication between the remote control device and the drone 100 uses standards and technology known in the art.

The body 110 may also include at least four landing legs 13. Two landing legs 13 may be coupled to the side cross beam 8, and two landing legs 13 may be coupled to the opposite side cross beam 8'. Although four landing legs are illustrated, more or less number of landing legs may be included.

The central unit may include a water reservoir 36, a water pump 35, two sensor towers 37, a safety failover mechanism, for example, a parachute module 33, and a processor (not shown). In some embodiments, when one or more propellers 4 fail, for example, as monitored by the sensors 37, the parachute module operates to deploy a parachute, so the drone 100 can land safely. The parachute module may include a launching tube, a launching puck, and a top.

In some embodiments, the safety failover mechanism may include a tether mechanism. For example, the drone may be tethered to a power supply connection or a cleaning material connection. The tether may also operate as a safety failover, for example, in a loss of control scenario where an operator may retract the drone away from areas of danger.

When the drone is tethered to a power supply, for example, from above or below, the tether may provide lift relief if the drone is suspended by the tether. In these embodiments, power may not be limited to the capacitance onboard the drone, and may be provided from the larger power supply that is grounded.

In some embodiments, the central unit may also include a reservoir for holding soap or other cleaning material.

In some embodiments, the drone 100 may use an automated swapping system to swap out a liquid reservoir.

The central unit may also include a battery module 14 with a quick change battery plate. The battery module 14 may receive one or more batteries. In some embodiments, the drone 100 may support rechargeable batteries. In some embodiments, the drone 100 may support non-rechargeable batteries. In some embodiments, the battery module 14 may include a receptacle or connector for charging batteries.

In some embodiments, the drone 100 may use an automated swapping system to swap out batteries or other power sources.

The drone 100 may include at least one front view camera 34. The camera 34 may be positioned on a cleaning head unit 80, which will be described in more detail herein. The camera 34 will enable the operator of the drone 100 to see the area being washed with detail. In some embodiments, the camera 34 may also be operated to position the surface washing drone in place relative to its target. The positioning of the drone 100 may be controlled by the operator. In some embodiments, the positioning of the drone 100 may be controlled autonomously by software located in the drone 100, for example, in a central processing unit (CPU) of the processor as part of a computer vision function of the drone 100.

The computer vision function of the drone 100 may include one or more cameras and a CPU software that may allow the drone 100 to recognize and react to objects. The computer vision function may assist in navigation, ranging, and interaction with its cleaning target (for example, cleaning surfaces). The computer vision function may work with the modular cleaning head unit 80 to adjust accordingly. The computer vision function may assist in reconnaissance, 3D mapping, survey to identify cleanable surfaces of a building. It may identify when a cleaning target may count as clean and when a cleaning target may not count as clean. The cleanliness standards described herein above may be used.

In some embodiments, a software may use results from a survey of the cleaning target and mathematically arrange the best scheduling of the drone or drones available, for example, against the number of panes to be cleaned. The survey results may come from computer vision functions as described herein using camera, or may be provided. The software may also create a flight plan and control the drone or drones. The software may also optimize based on current status of supply and power from each drone. Such optimization may include, for example, precise cleaning, stability algorithms, and details about the type of cleaning interaction.

The stability algorithms may be part of a stability mechanism of the drone 100, In some embodiments, the stability mechanism may include a function of a collection of sensors, physical structure, and algorithms that allow the drone 100 to maintain a steady platform in challenging conditions. Challenging conditions may include, for example, wind up to 30 knots and a disruptive force on the drone 100 of up to 7 G's. Physical structure components may include ducts around propellers to protect them, shock absorbers, use of a tether, or an arm like clamp that may hold the drone in place. Sensors may include laser range finders or cameras, or other suitable devices, to position the drone in place relative to its cleaning target. In some embodiments, the stability algorithms may function on a feedback system that may take in orientation data from the sensors and may adjust output to the propellers accordingly, for example, to compensate for disruptive forces.

In some embodiments, the CPU may include a drone-hack failover function. In the event of an electronic loss of communication or a hacking event, a hacking resistant firmware or software as well as an electronic failover of the CPU may autonomously direct the drone 100 to a safe position. In some embodiments, the firmware or software may be able to resist at least 95% of the most common hacking methods.

A spray tubing 31 connects the water reservoir 36 to one or more sprayers 29. The spray tubing 31 is coupled to the body 110 using one or more hose mounts 32. The sprayers 29 may be disposed at the cleaning head unit 80. The water pump 35 transfers fluid stored in the water reservoir 36 to the sprayers 29 via the spray tubing 31.

In some embodiments, the water pump 35 and the sprayers 29 may be controlled by a remote control device. The sprayers 29 may support various spray speeds and patterns.

In some embodiments, the drone 100 may include a high-pressure air blowing device used to clean an area of debris and may also be used to dry a surface.

Figure 5:
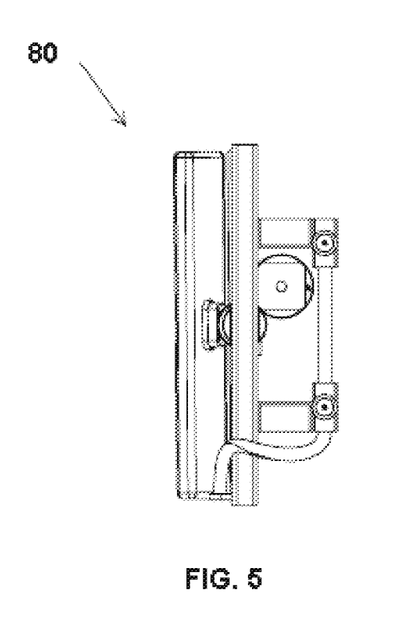
FIG. 5 illustrates a top view of a cleaning head unit of a surface washing drone according to an example embodiment of the invention.
Figure 6:
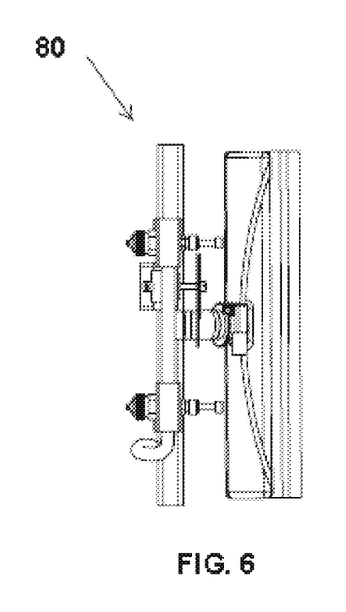
FIG. 6 illustrates a bottom view of a cleaning head unit of a surface washing drone according to an example embodiment of the invention.
Figure 7:
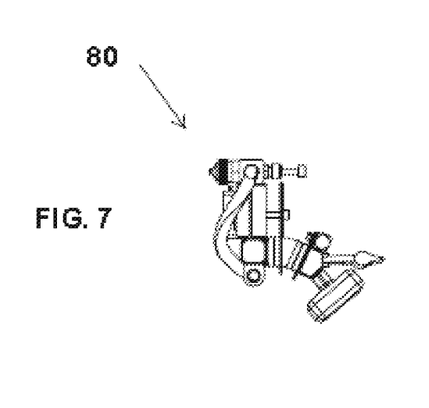
FIG. 7 illustrates a left side view of a cleaning head unit of a surface washing drone according to an example embodiment of the invention.

FIGS. 5 to 9 illustrates example embodiments of the cleaning head unit 80 of a surface washing drone as used in, for example, the drone 100. FIG. 5 illustrates an example embodiment of a bottom view of the cleaning head unit 80. FIG. 6 illustrates an example embodiment of a top view of the cleaning head unit 80. FIG. 7 illustrates an example embodiment of a left side view of the cleaning head unit 80.

Figure 8:
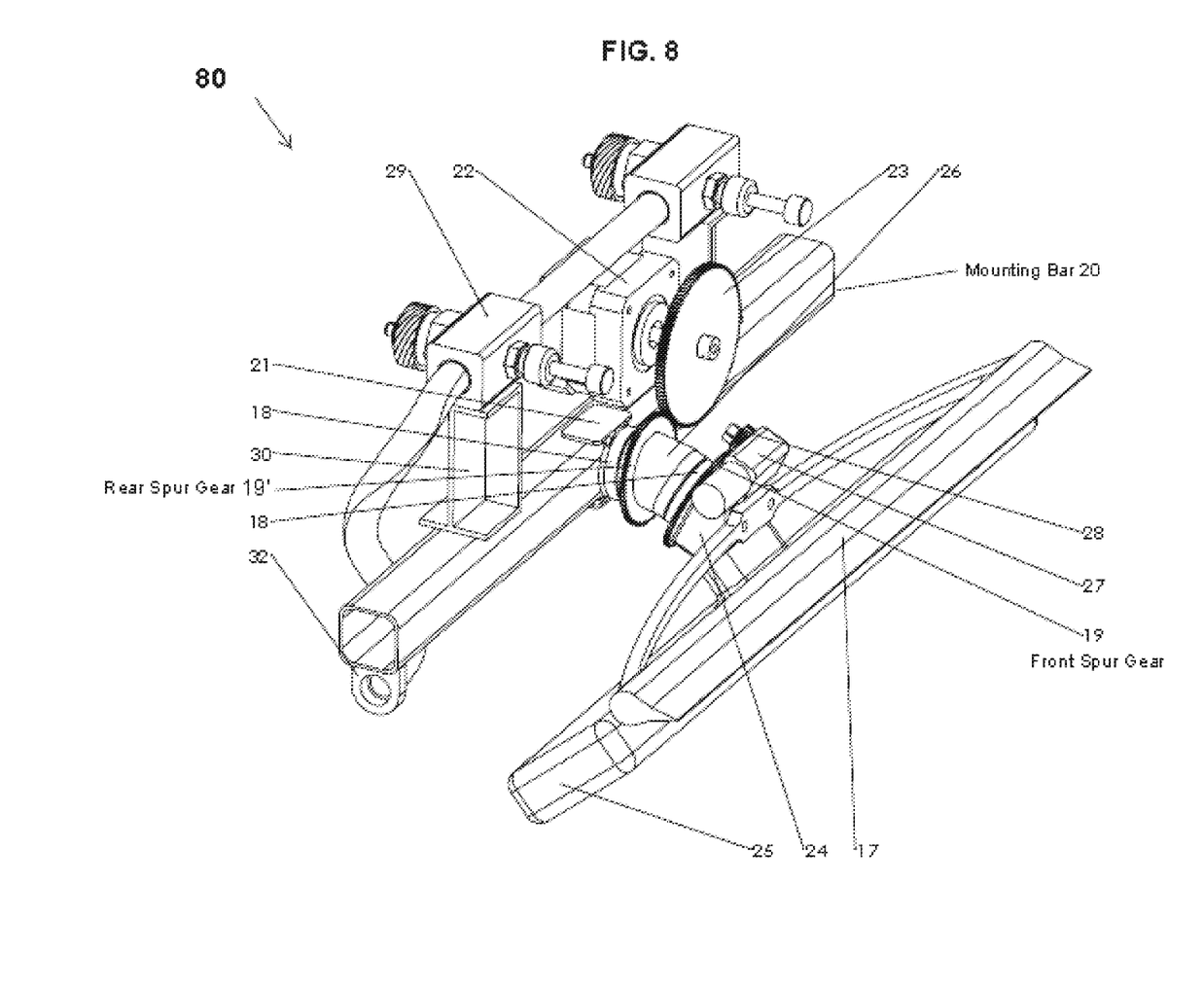
FIG. 8 illustrates a left perspective view of a cleaning head unit of a surface washing drone according to an example embodiment of the invention.

FIG. 8 illustrates an example embodiment of a front, left perspective view of a cleaning head unit 80. The cleaning head unit 80 may be coupled to the mounting bar 20 of the body 110. In some embodiments, the cleaning head unit 80 may include the mounting bar 20. The cleaning head unit 80 may include a cleaning head, or applicator, 25. In some embodiments, the cleaning head 25 may be flexible, or bendable. As a result, the cleaning head 25 may adapt to the contours of various surfaces, for example, skylights, sides of boats, and so on, including surfaces that are convex or concave in nature. The cleaning head unit 80 may also include a squeegee 17 disposed above the cleaning head 25. In some embodiments, the squeegee 17 may be flexible, or bendable. The cleaning head 25 and the squeegee 17 may be referred to together as a washing head. In some embodiments, the cleaning head 25 and the squeegee 17 may operate and move as a unit.

The cleaning head 25 and the squeegee 17 are coupled to the mounting bar 20 at least via swivel hubs 18, spur gears 19, angle block 26, and washing head swivel mount 24. A right angle gear motor 27 and spur gear 28 may be coupled to the washing head swivel mount 24 such that the spur gear 28 engages the proximal, front spur gear 19. The right angle gear motor 27 may be controlled, via a remote control device or software on the drone 100, to rotate the washing head clockwise or counterclockwise at an angle from 0 up to approximately 180 degrees.

The cleaning head unit 80 may also include a stepper motor 29 coupled to the mounting bar 20. The stepper motor 29 controls the operation of a spur gear 23 attached to the stepper motor 29. The spur gear 23 engages the distal, rear spur gear 19'. When the spur gear 23 rotates, it causes the rear spur gear 19' to rotate, which causes the washing head to rotate clockwise or counterclockwise at an angle from 0 up to approximately 180 degrees. The movements of the spur gears 19, 19', 23, and 28 create a pivot point that may swap the squeegee 17 and cleaning head 25 from contacting the surface being washed, and another pivot point that may control the orientation of the "active" part.

In some embodiments, the spur gears 19, 19', 23, and 28 may operate in a non-rotating operation, causing the cleaning head unit 80 to operate in a sweeping function.

In some embodiments, the cleaning head unit 80 may self-adjust to the variable cleaning surface. For example, the cleaning head unit 80 may self-adjust to operate in either a rotating, sweeping, or stationary function, or in a combination thereof.

The cleaning head unit 80 may also include at least two sprayers 29, mounted on sprayers mounts 30, which are coupled to the mounting bar 20. The sprayers 29 may be connected to the water reservoir via the spray tubing 31. The sprayers include spray mechanism which sends out a jet stream of fluid.

In some exemplary operations, when the washing head is rotated 180 degrees up, it gets in the way of the sprayers 29. In this position, the sprayers 29 spray fluid on and wet the cleaning head or applicator 25.

In some embodiments, the drone 100 may also include suction cups (not shown) for attaching the drone 100 to a cleaning target, for example, to the surface of a window, a skylight, a side of a boat, and so on. The drone 100 may include a vacuum pump for controlling the holding force applied to the suction cups. An advantage of the suction cups is to keep the drone 100 steady during windy weather.

In some embodiments, the drone 100 may use an automated swapping system to swap out specific parts of a device that may be needed to be replaced or refreshed. These parts may include, for example, rotors or mechanical parts.

Figure 9:
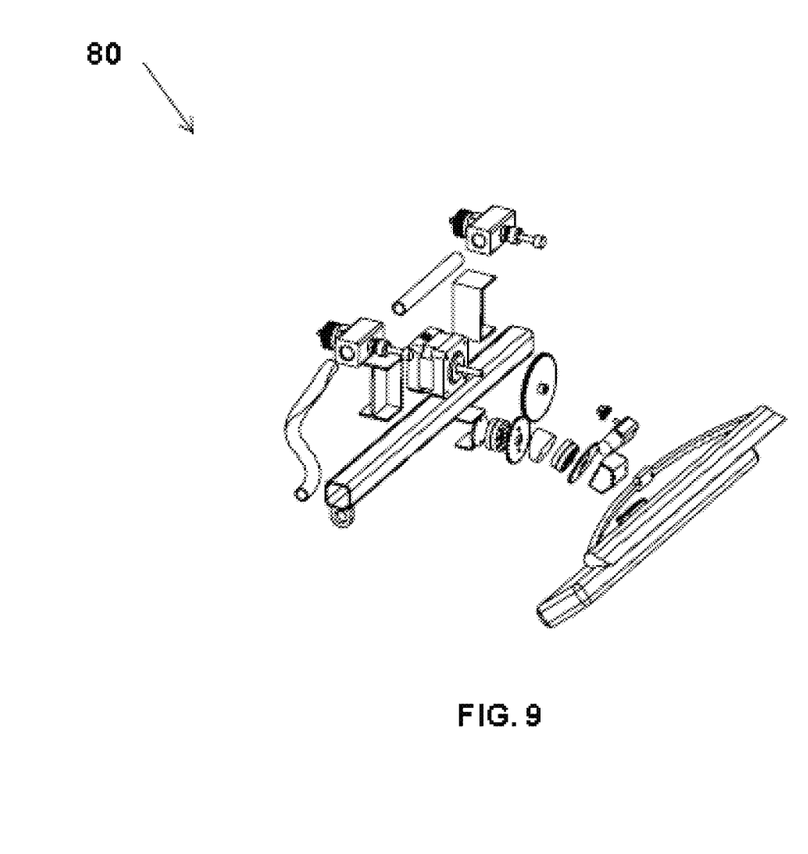
FIG. 9 illustrates an exploded view of a cleaning head unit of a surface washing drone according to an example embodiment of the invention.

FIG. 9 illustrates an example embodiment of an exploded view of the cleaning head unit 80.

Figure 10:
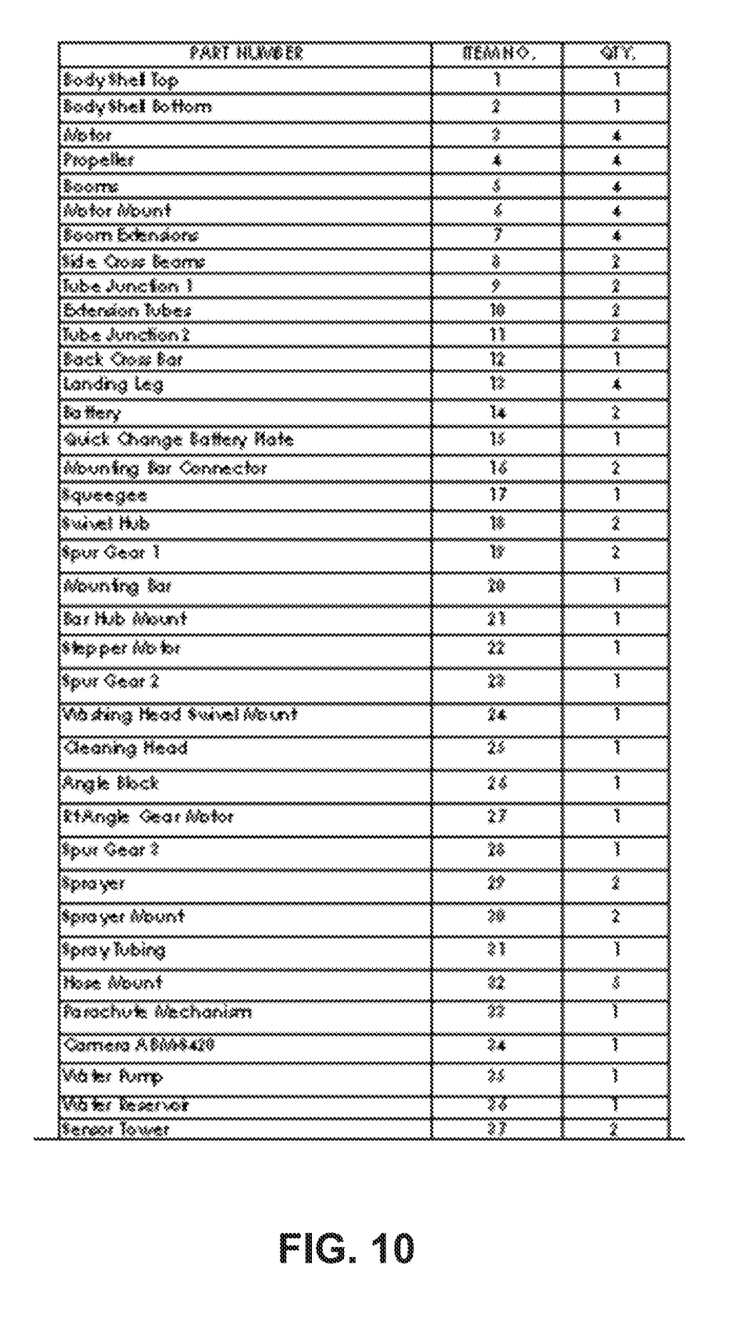
FIG. 10 illustrates a partial part list of the surface washing drone of FIG. 1 according to an example embodiment of the invention.

FIG. 10 illustrates an exemplary partial list of the components of the drone 100.

FIGS. 11 to 15 illustrate example embodiments of a surface washing drone 200. It should be noted that the drone 200 includes components, features and functions similar to those of the drone 100 described herein above. In some embodiments, the drone 200 may include a tether, or connection, for water supply, in place of, or in addition to, a water reservoir.

In some embodiments, the drone 100 tether may feed both power and liquid through the same conduit.

Figure 11:
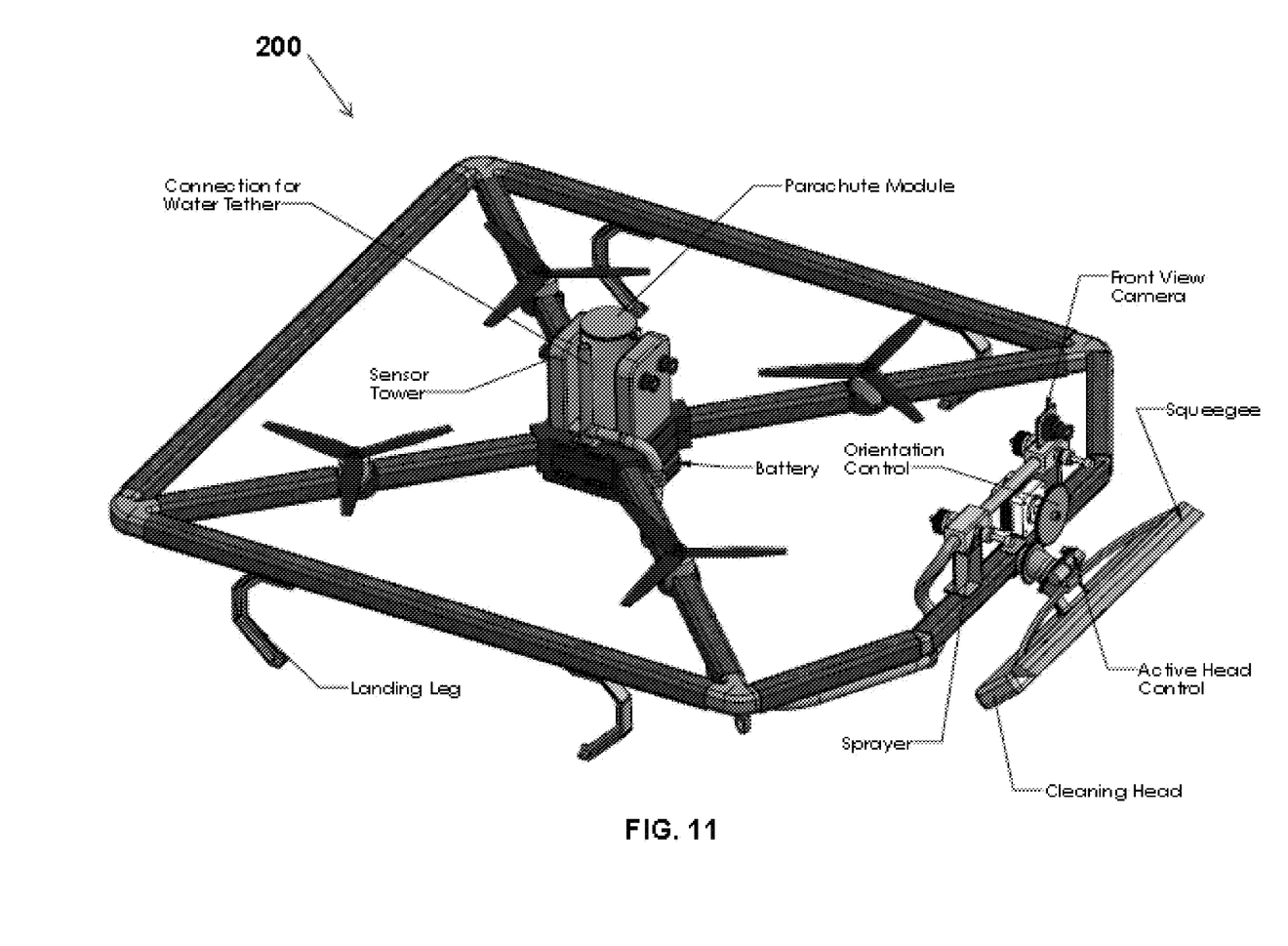
FIG. 11 illustrates a front, left perspective view of a surface washing drone with a connection for water supply according to an example embodiment of the invention.

FIG. 11 illustrates a front, left perspective view of an example embodiment of the drone 200. Generally, the drone 200 may include a body with a plurality of landing legs coupled to the body. The drone 200 may also include a central unit coupled to the body. The central unit may include, for example, battery, sensor towers, a connection for water supply, a safety failover mechanism, for example, a parachute module, and a processor. The drone 200 may also include a cleaning head unit disposed at the front of the body. The cleaning head unit may include one or more front view cameras, one or more sprayers, an active head control, an orientation control, and a cleaning head or applicator. The cleaning head unit may include both an applicator and a squeegee.

In some embodiments, the safety failover mechanism may include a tether mechanism. For example, the drone may be tethered to a power supply connection or a cleaning material connection. The tether may also operate as a safety failover. The water supply connection discussed above may also operate as a safety failover.

Figure 12:
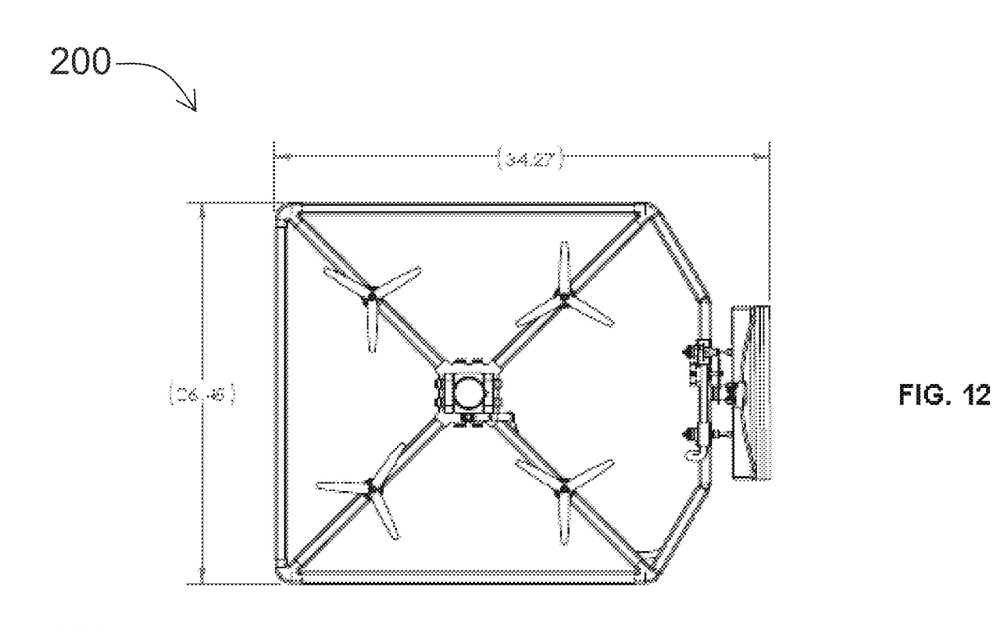
FIG. 12 illustrates a top view of the surface washing drone of FIG. 11 according to an example embodiment of the invention.

FIG. 12 illustrates a top view of an example embodiment of the drone 200. In some example embodiments, the drone 200 may have a width of approximately 26.45 inches, and a length of approximately 34.27 inches, including the cleaning head unit.

Figure 13:
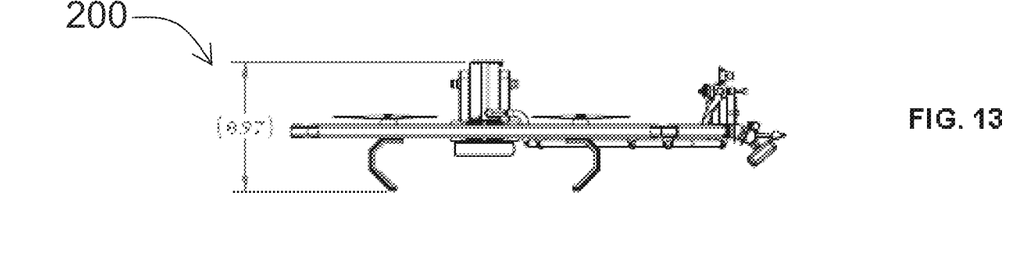
FIG. 13 illustrates a left, side view of the surface washing drone of FIG. 11 according to an example embodiment of the invention.

FIG. 13 illustrates a left side view of an example embodiment of the drone 200. In some example embodiments, the drone 200 may have a height of 8.97 inches, including the central unit and the landing legs.

Figure 14:
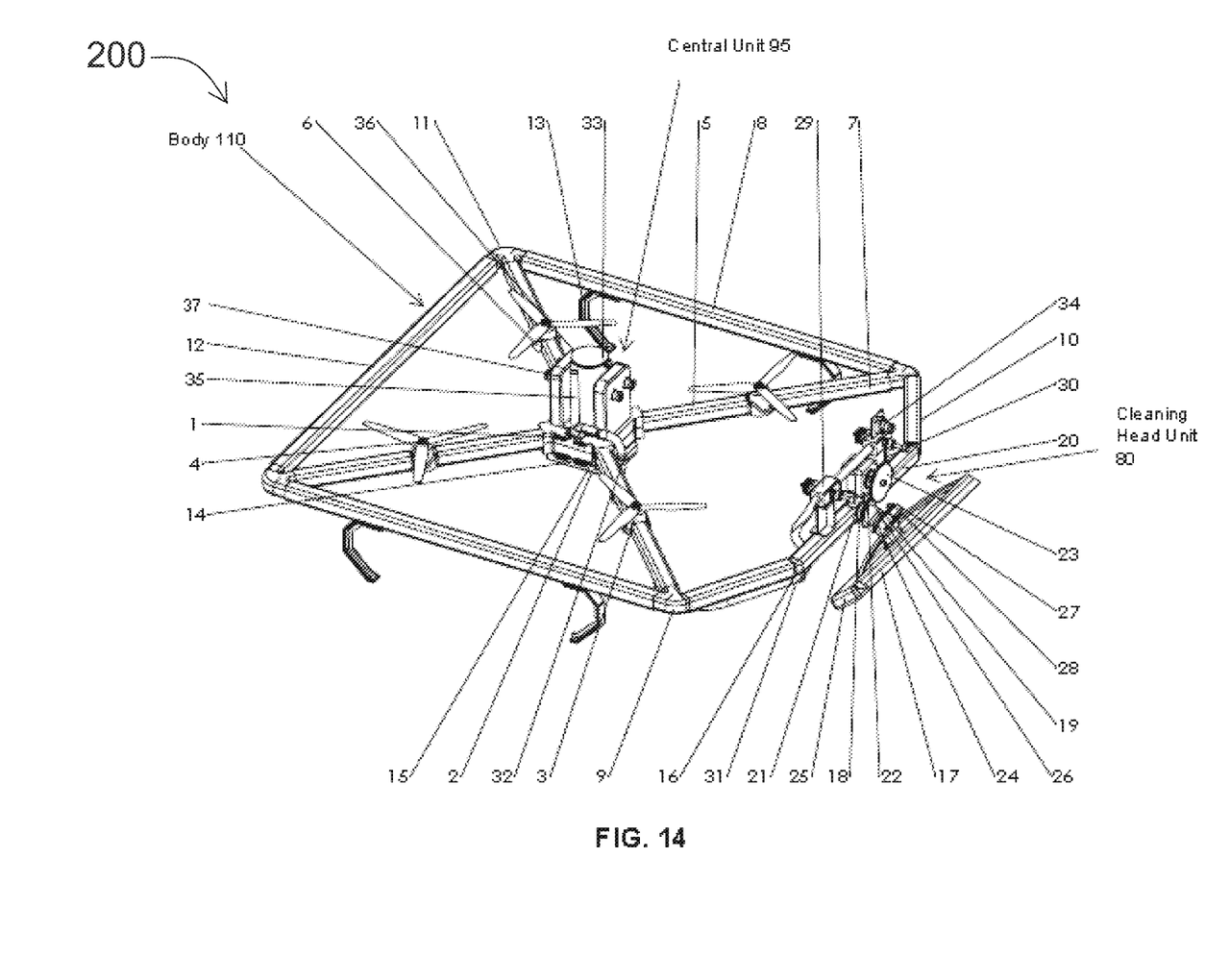
FIG. 14 illustrates another front, left perspective view of the surface washing drone of FIG. 11 according to an example embodiment of the invention.

FIG. 14 illustrates another front, left perspective view of an example embodiment of the drone 200. The drone 200 may include a main body 110 as described herein for the drone 100. The drone 200 may also include a cleaning head unit 80 as described herein for the drone 100. For flying, the drone 200 may include four propellers 4 as described herein for the drone 100. Although four propellers are illustrated, the number of propellers is not limited to four. In some embodiments, the drone 100 may include less than four propellers. In some embodiments, the drone 100 may include more than four propellers.

The drone 200 includes a central unit 95. The central unit 95 may include a water connection tether hose tower 35, two sensor towers 37, and a safety failover mechanism, for example, a parachute module 33. In some embodiments, when one or more propellers 4 fail, for example, as monitored by the sensors 37, the parachute module 33 operates to deploy a parachute, so the drone 100 can land safely. The parachute module 33 may include a launching tube, a launching puck, and a top.

In some embodiments, the water connection tether hose tower 35 is sized to receive a hose that may be connected to the top of a building, the ground, or through an opening in the building, to receive water supply.

Figure 15:
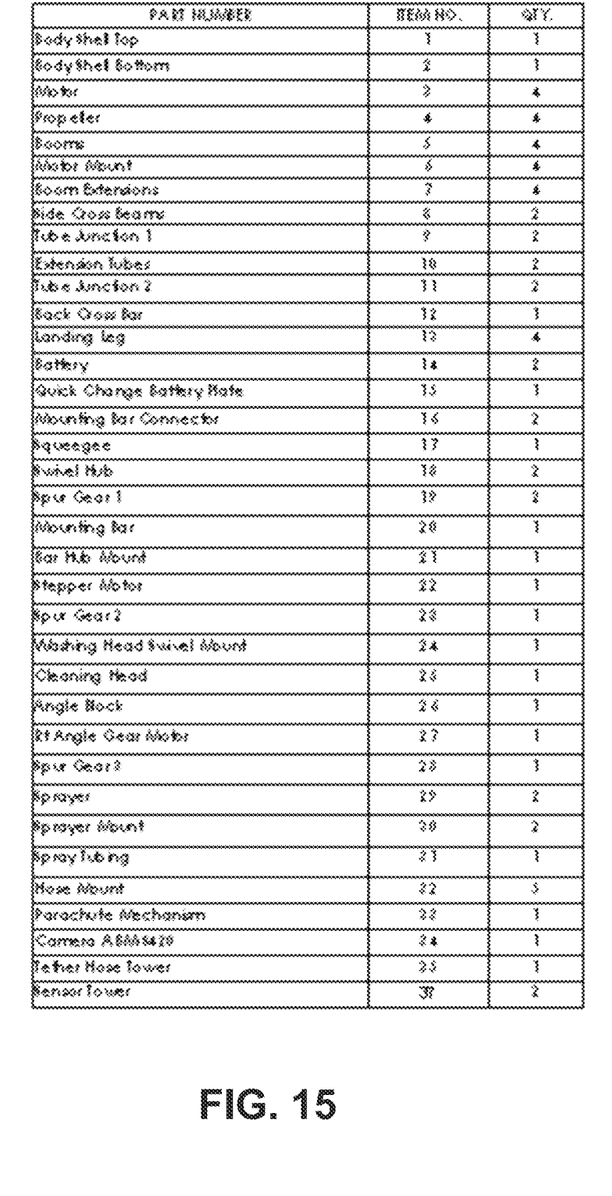
FIG. 15 illustrates a partial part list of the surface washing drone of FIG. 11 according to an example embodiment of the invention.

FIG. 15 illustrates an exemplary partial list of the components of the drone 200.

In some embodiments, the drones of the disclosure may wash windows having screens. In order to wash the window with a screen, a solution may be sprayed over the screen and then it would air dry.

The embodiments described in detail above are considered novel over the prior art of record and are considered critical to the operation of at least one aspect of the apparatus and its method of use and to the achievement of the above described objectives. The words used in this specification to describe the instant embodiments are to be understood not only in the sense of their commonly defined meanings, but to include by special definition in this specification: structure, material or acts beyond the scope of the commonly defined meanings. Thus if an element can be understood in the context of this specification as including more than one meaning, then its use must be understood as being generic to all possible meanings supported by the specification and by the word or words describing the element.

The definitions of the words or drawing elements described herein are meant to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements described and its various embodiments or that a single element may be substituted for two or more elements.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

The scope of this description is to be interpreted only in conjunction with the appended claims and it is made clear, here, that each named inventor believes that the claimed subject matter is what is intended to be patented.

What is claimed is:

1. A surface washing drone comprising:
a body;
at least four propellers coupled to the body;
a central unit coupled to the body, wherein the central unit includes a processor, a fluid reservoir, a pump, and one or more sensors; and
a drone head coupled to a front part of the body, the drone head includes a cleaning head and a squeegee, wherein the drone head further includes one or more motors to control a plurality of spur gears that control the movements of the cleaning head and the squeegee.

2. The surface washing drone of claim 1 further comprises a parachute module.

3. The surface washing drone of claim 1 further comprises a power supply tether.

4. The surface washing drone of claim 1, wherein the cleaning head and the squeegee pivot.

5. The surface washing drone of claim 1, wherein the cleaning head and the squeegee rotate clockwise and counterclockwise.

6. The surface washing drone of claim 1 further comprises a rotating camera.

7. The surface washing drone of claim 1 further comprises a computer vision function, the computer vision function including one or more cameras and CPU software.

8. The surface washing drone of claim 7, wherein the computer vision function assists in at least navigation, ranging, and interaction with a cleaning target.

9. The surface washing drone of claim 1, wherein the processor transmits encrypted data.

10. The surface washing drone of claim 1 further communicates and works together with one or more other surface washing drones in a group.

11. A surface washing drone comprising:
a body;
at least four propellers coupled to the body;
a central unit coupled to the body, wherein the central unit including a processor, a parachute module, a connection for fluid supply, and one or more sensors; and
a drone head coupled to a front part of the body, the drone head includes a cleaning head and a squeegee, wherein the drone head further includes one or more motors to control a plurality of spur gears that control the movements of the cleaning head and the squeegee.

12. The surface washing drone of claim 11 further comprises a power supply tether.

13. The surface washing drone of claim 11, wherein the cleaning head and the squeegee pivot.

14. The surface washing drone of claim 11, wherein the cleaning head and the squeegee rotate clockwise and counterclockwise.

15. The surface washing drone of claim 11 further comprises a rotating camera.

16. The surface washing drone of claim 11 further comprises a computer vision function, the computer vision function including one or more cameras and CPU software.

17. The surface washing drone of claim 16, wherein the computer vision function assists in at least navigation, ranging, and interaction with a cleaning target.

18. The surface washing drone of claim 11, wherein the processor transmits encrypted data.

19. The surface washing drone of claim 11 further communicates and works together with one or more other surface washing drones in a group.

* * * * *